United States Patent
Harvey et al.

(10) Patent No.: US 7,562,087 B2
(45) Date of Patent: Jul. 14, 2009

(54) METHOD AND SYSTEM FOR PROCESSING DIRECTORY OPERATIONS

(75) Inventors: Richard H. Harvey, Ringwood East (AU); Ronald W. Ramsay, Ringwood (AU)

(73) Assignee: Computer Associates Think, Inc., Islandia, NY (US)

( * ) Notice: Subject to any disclaimer, the term of this patent is extended or adjusted under 35 U.S.C. 154(b) by 229 days.

(21) Appl. No.: 11/536,223

(22) Filed: Sep. 28, 2006

(65) Prior Publication Data

US 2007/0078887 A1 Apr. 5, 2007

Related U.S. Application Data

(60) Provisional application No. 60/722,917, filed on Sep. 30, 2005.

(51) Int. Cl.
*G06F 17/00* (2006.01)
(52) U.S. Cl. ...................... 707/101; 707/102
(58) Field of Classification Search ................. 707/101, 707/102
See application file for complete search history.

(56) References Cited

U.S. PATENT DOCUMENTS

| | | | |
|---|---|---|---|
| 5,537,592 A | 7/1996 | King et al. | |
| 6,073,129 A | 6/2000 | Levine et al. | |
| 6,167,402 A | 12/2000 | Yeager | |
| 6,199,062 B1 | 3/2001 | Byrne et al. | |
| 6,711,562 B1 | 3/2004 | Ross et al. | |
| 6,865,576 B1 | 3/2005 | Gong et al. | 707/100 |
| 2001/0037339 A1 | 11/2001 | Harvey | 707/102 |
| 2004/0078368 A1 | 4/2004 | Excoffier et al. | 707/4 |
| 2004/0117621 A1 | 6/2004 | Knight | |
| 2005/0102297 A1* | 5/2005 | Lloyd et al. | 707/100 |
| 2005/0172100 A1 | 8/2005 | DiGregorio | |
| 2006/0074925 A1 | 4/2006 | Bixby et al. | |

FOREIGN PATENT DOCUMENTS

| | | |
|---|---|---|
| DE | 199 54 534 A1 | 5/2000 |
| EP | 1 313 039 A2 | 5/2003 |
| WO | WO 01/46856 A1 | 6/2001 |
| WO | WO 03/038669 A1 | 5/2003 |
| WO | WO 2005/114486 A1 | 12/2005 |

OTHER PUBLICATIONS

PCT Notification of Transmittal of the International Search Report with attached PCT International Search Report and Written Opinion of the International Searching Authority in International Application No. PCT/US2006/038057 filed Sep. 29, 2006 (11 pages).

* cited by examiner

*Primary Examiner*—Uyen T. Le
(74) *Attorney, Agent, or Firm*—Baker Botts L.L.P.

(57) ABSTRACT

According to one embodiment of the invention, a method for creating an index arrangement for a directory includes configuring control variables. The control variables include criteria for data to be stored and indexed in an alternate evaluator. The method also includes retrieving data values from the directory in accordance with the control variables. The method further includes storing the retrieved data values. The method further includes generating an index in the alternate evaluator for the stored data values based on the control variables.

21 Claims, 2 Drawing Sheets

METHOD AND SYSTEM FOR PROCESSING DIRECTORY OPERATIONS

CROSS REFERENCE TO RELATED APPLICATIONS

This application claims the benefit of priority under 35 U.S.C. § 119(e) of U.S. Provisional Patent Application Ser. No. 60/722,917 entitled "Dynamic Creation of Indexes in an Alternate Evaluator," which was filed on Sep. 30, 2005.

TECHNICAL FIELD OF THE INVENTION

This invention relates generally to directories, and more particularly, to a method and system for creating an index arrangement for a directory.

BACKGROUND OF THE INVENTION

A directory is a network service that provides users and applications with quick access to information. Typical uses of a directory include locating an Internet host address and storing information about users in a system having a number of interconnected machines. Example directories include Lightweight Directory Access Protocol (LDAP) directories, X.500 directories, and Directory Services Markup Language (DSML) directories. The speed and efficiency of directories are important aspects of overall directory performance. Conventional methods for increasing directory performance involve increased use of hardware, software, or a combination of both hardware and software. For example, additional CPUs, disks, memory, and directory server processes may be utilized in order to improve response times. However, although these conventional methods improve performance, they do so at a high cost.

OVERVIEW OF EXAMPLE EMBODIMENTS

According to one embodiment of the invention, a method for creating an index arrangement for a directory includes configuring control variables. The control variables include criteria for data to be stored and indexed in an alternate evaluator. The alternate evaluator includes a processor operable to process a directory operation. The method also includes retrieving data values from the directory in accordance with the control variables. The method further includes storing the retrieved data values. The method further includes generating an index in the alternate evaluator for the stored data values based on the control variables.

Technical advantages of particular embodiments of the present invention include a method and system for creating an index arrangement for a directory that increases speed of loading the required indexes by avoiding building the indexes on disk.

Another technical advantage of particular embodiments of the present invention includes a method and system for creating an index arrangement for a directory that avoids slow initial responses to queries. Thus, maximum performance for processing directory operations may be achieved.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Embodiments of the present invention and its advantages are best understood by referring to FIGS. 1A through 3 of the drawings, like numerals being used for like and corresponding parts of the various drawings.

Figure 1A:
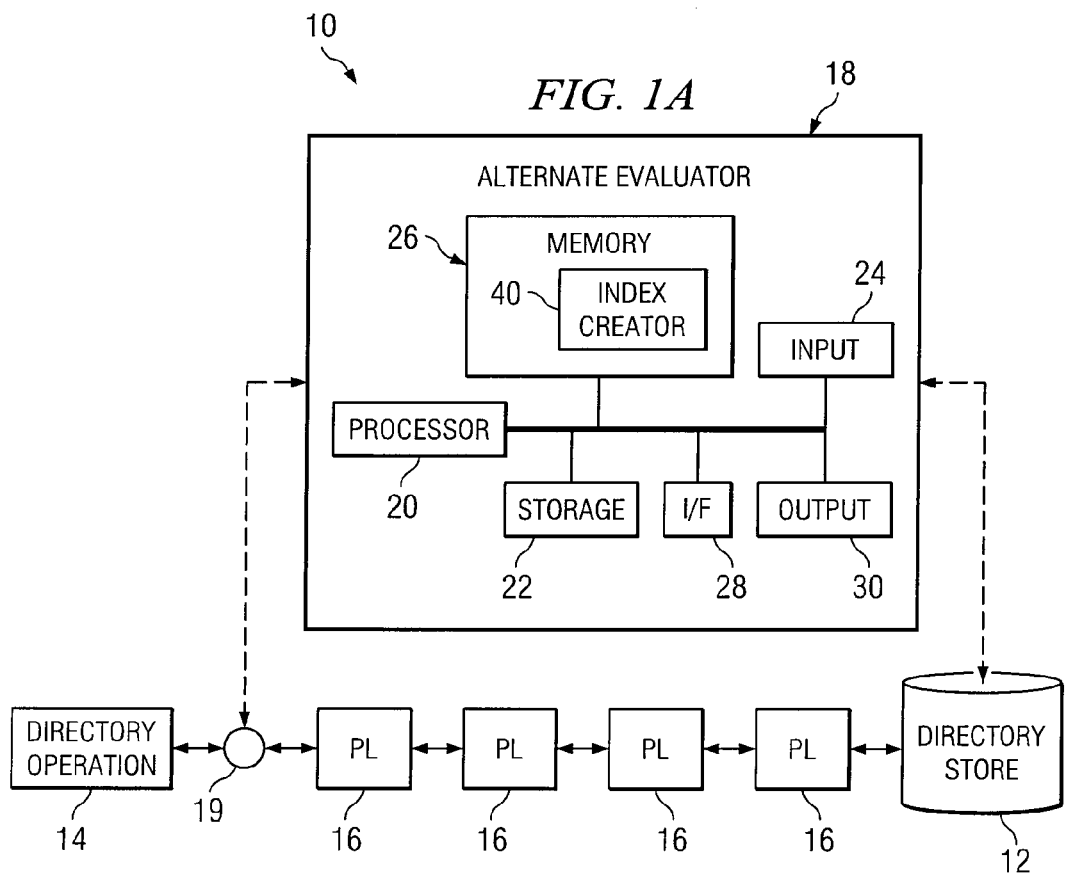
FIG. 1A is a block diagram illustrating a system for creating an index arrangement for a directory according to the teachings of the invention.

FIG. 1A is a block diagram illustrating a system 10 for creating an index arrangement for a directory according to the teachings of the invention. As shown in FIG. 1A, system 10 generally includes a directory store 12, a directory operation block 14, one or more processing layers 16, and an alternate evaluator 18. System 10 is particularly adapted for processing directory operation block 14 using alternate evaluator 18.

Directory store 12 may represent any suitable device operable to store and organize directory data. Example directories may include network operating system directories for managing logins, file-systems, and printers; security directories for single sign-on, web access management, and service management; application specific directories, such as online telephone directories, location directories, and email directories; and publishing directories, such as white pages, yellow pages, and blue pages.

Directory store 12 may be used in conjunction with any suitable protocol operable to allow users and applications to access directory data. For example, Lightweight Directory Access Protocol (LDAP) is a string based protocol that allows users and applications to access directory data. An example of a typical LDAP directory is a human resource (HR) directory wherein each entry may represent an employee record. Directory entries may have attributes. For example, in the case of the HR directory, the employee's last name, first name, email address, job title, office location, and phone number may represent various attributes of an entry. Each entry may be uniquely identified by a distinguished name (DN), which is a unique identifier for each entry. Generally speaking, a distinguished name is similar to an absolute path to a file. For example, a naming attribute for an entry may be an email address for an employee. In the example of a file system, the naming attribute is similar to a file name. To get the distinguished name for the full path to the entry, the naming attribute may be appended to the full sequence of directory nodes that serve as ancestors to the naming attribute. Therefore, an employee's email address may be expressed as a naming attribute for an entry, and the distinguished name refers to the full path to the entry. Other examples of suitable protocols include, but are not limited to, X.500 and Directory Services Markup Language (DSML), which is a variant of Extensible Markup Language (XML).

Directory operation block 14 may refer to any suitable process for accessing directory data. For example, directory operation block 14 may be a query operation. Query operations may refer to any suitable process for retrieving information from a directory. Query operations may include "read" for reading data, "list" for listing data, "search" for searching for data and "compare" for comparing data. As another example, directory operation block 14 may be an update operation. Update operations may refer to any suitable process for updating information in a directory. Update operations may include "add" for adding data, "remove" for deleting data, "modify" for changing data and "ModifyDN" for changing the DN associated with data. However, the present disclosure contemplates many types of directory operations. Various embodiments may include, some, all, or none of the enumerated directory operations.

Processing layer 16 may refer to any suitable functional component operable to execute a process on behalf of directory operation block 14. For example, processing layer 16 may be used to decode protocols used by directory operation block 14, converting directory operation block 14 into standard protocols such as SQL, interpreting the SQL, executing the SQL, handling disk cache buffers, and utilizing an operating system to retrieve data from directory store 12. As another example, processing layer 16 may be software for authentication and routing.

Alternate evaluator 18 may represent any suitable device operable to process directory operation block 14. For example, a switch 19 may be provided at a point along the data path that connects one or more processing layers 16. In the illustrated embodiment, switch 19 is placed before the first processing layer 16. Switch 19 may examine directory operation block 14 to determine whether alternate evaluator 18 may be able to process directory operation block 14. In making this determination, switch 19 may rely on local configurations, for example, programmed logic that resides locally within switch 19. Alternate evaluator 18 may process directory operation block 14 by accessing indexed data stored on a local data store. One example of alternate evaluator 18 is described in pending U.S. application Ser. No. 11/270,794 entitled "Method and System for Configuring a Supplemental Directory" filed Nov. 9, 2005, which is incorporated by reference herein. Additional details of other examples of alternate evaluator 18 are described in more detail below.

In various embodiments of the invention, one or more processing layers 16 may increase the time required to respond to directory operation block 14. For example, one or more processing layers 16 may be software for checking a structure, checking a schema, controlling access to directory store 12, and optimizing operation filters. As a result, one or more processing layers 16, and accessing directory store 12 directly, may create a bottleneck in the directory system.

According to one embodiment of the invention, a system and method are provided that reduce the time needed to process directory operations. This is effected by configuring control variables at the alternate evaluator to control the data values loaded from directory store 12 and creating indexes for the loaded data values. By loading and indexing data values in accordance with control variables, indexes to the actual data values are built dynamically and efficiently in memory. Thus, one or more processing layers 16 may be avoided, significantly reducing the time required to process directory operation block 14. Additional details of example embodiments of the invention are described in greater detail below in conjunction with portions of FIG. 1A, FIG. 1B, FIG. 2, and FIG. 3.

According to the illustrated embodiment of the invention, alternate evaluator 18 includes a processor 20, a storage device 22, an input device 24, a memory device 26, a communication interface 28, an output device 30, and an index creator 40.

Processor 20 may refer to any suitable device operable to execute instructions and manipulate data to perform operations for alternate evaluator 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for alternate evaluator 18, send output from alternate evaluator 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows alternate evaluator 18 to communicate to other devices. For example, communication interface 28 may include any suitable software operable to access data from various devices such as directory store 12, a file system, and input device 24. Communication interface 28 may communicate with various devices to read and/or write data such as directory data from directory store 12, receive directory operation block 14, receive interactive commands from an administrator, and read configuration data from a file system at runtime. Communication interface 28 may include one or more ports, conversion software, or both.

Output device 30 may refer to any suitable device operable for displaying information to a user. Output device 30 may include, for example, a video display, a printer, a plotter, or other suitable output device.

Index manager 40 may refer to any suitable logic embodied in computer-readable media, and when executed on processor 20, that is operable to manage indexes for data stored on alternate evaluator 18. In the illustrated embodiment of the invention, index manager 40 resides in memory device 26. In other embodiments of the invention, index manager 40 may reside in storage devices operable to store and facilitate retrieval of data and instructions. In operation, index creator 40 may be executed on processor 20, store and retrieve data in memory device 26, receive and send data through communication interface 28, and receive and display data through input device 24 and output device 30. Additional details of example embodiments of index creator 40 are described in greater detail below in conjunction with portions of FIG. 1B.

Figure 1B:
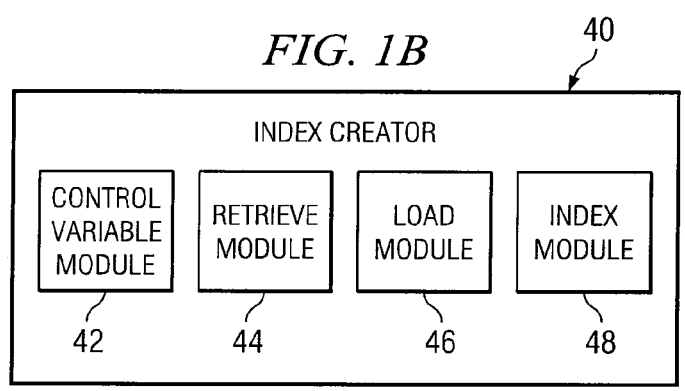
FIG. 1B is a block diagram illustrating an example index creator of the system of FIG. 1A in accordance with an embodiment of the present invention.

FIG. 1B is a block diagram illustrating an example index creator 40 of system 10 of FIG. 1A in accordance with an embodiment of the present invention. Index creator 40 may include various modules operable to perform various functions, including a control variable module 42, a retrieve module 44, a load module 46, and an index module 46. According to one embodiment of the invention, index creator 40 may build and store an integrated memory-based indexing system to actual data loaded from directory store 12 according to control variables.

According to one embodiment of the invention, a directory provided by directory store 12 may be viewed as a structure. Information stored in a structure may be stored in a tree-like structure and is similar to the tree model used by most file systems. A structure may sometimes be referred to as a directory tree or a directory information tree (DIT). In one embodiment, a LDAP directory may provide a directory information tree that serves as a hierarchy for the data stored in the LDAP directory. A directory information tree may refer to a bounded area in which a given name can be resolved. Name resolution is the process of finding an entry, which may be on another directory server. For example, a telephone book forms a directory information tree in which the names of telephone subscribers can be resolved to telephone numbers. Likewise, directory store 12 provides a directory information tree in which the name of an entry in the directory can be resolved to the entry itself. An entry may refer to a distinct, named set of attributes. For example, the entry may represent something concrete, such as a user, a printer, or an application. As another example, the entry may represent something abstract such as a classification. An attribute holds data describing the thing that is identified by the directory entry. Attributes of a user might include the user's given name, surname, and e-mail address.

Figure 2:
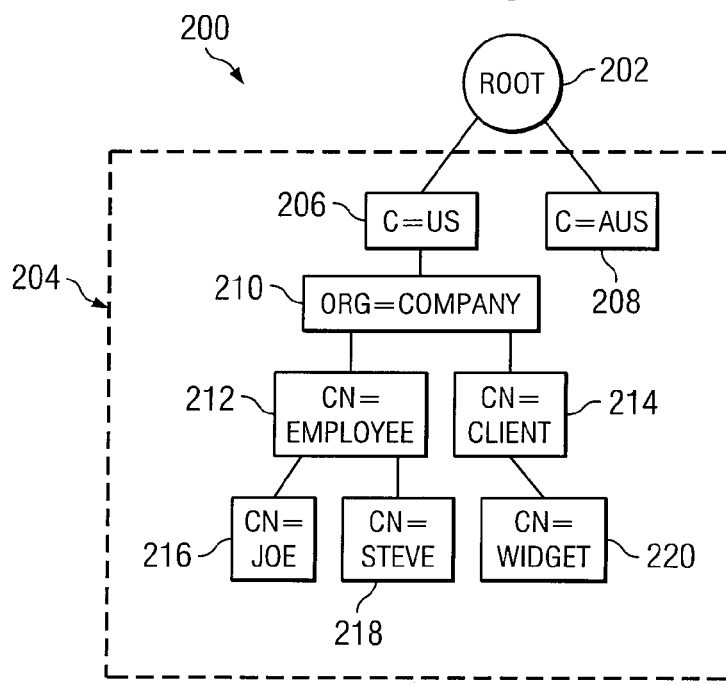
FIG. 2 is a block diagram illustrating an example directory structure of FIG. 1A, according to an embodiment of the invention.

FIG. 2 is a block diagram illustrating an example Directory information tree 200 of FIG. 1A, according to an embodiment of the invention. Directory information tree 200 may be generated by index creator 40 of FIG. 1B. According to the illustrated embodiment, directory information tree 200 generally includes a root 202 and a tree 204 comprising a hierarchy of entries. A container is used to hold or organize a group of entries and other containers. Tree 204 illustrates how entries are connected or the path from one entry to another. Directory information tree 200 includes two country nodes 206 and 208 corresponding to country=U.S. and country=Australia, respectively, and a sub-tree under node 206 comprising nodes 210 (organization=Company); nodes 212 and 214 (common name=Employee and common name=Clients, respectively); and nodes 216, 218, and 220 (common name=Joe, common name=Steve and common name=Widget, respectively). As indicated in the illustrated embodiment, 206 and its children nodes may be viewed as an organizational unit. Attributes of an employee indicated by entry 216 may include the employee's given name, surname, and e-mail address.

According to one embodiment of the invention, retrieve module 44 and index module 48 may retrieve and index entries and attributes based on control variables generated by control variable module 42. According to one embodiment, control variables may define a list of attribute types to be loaded. This results in the loading of the particular attributes from entries in a directory store. Attributes may refer to a type and one or more values. In addition, control variable module 42 may contain a special parameter that defines that all contents of all attributes should be loaded by setting a control variable to a special keyword, such "load all attributes."

According to another embodiment of the invention, control variables may define a list of particular attribute types to be loaded and indexed. This results in the loading of the particular attributes from entries in a directory store, and those attribute types may also be indexed. One result of indexing may be that the indexed values may also be searched. In addition, control variable module 42 may define that all attributes should be loaded and indexed, by setting a control variable to a special keyword, such as "load and index all attributes."

According to another embodiment of the invention, control variables may define particular entry names that should be loaded. When particular entry names are specified, the entry names may be loaded into alternate evaluator 18. In addition, all entry names may be loaded by setting a control variable to a special keyword, such as "load and index all attributes." Loading all entries, even if they don't contain any attributes is to facilitate complex searches, such as those containing a "NOT."

According to another embodiment of the invention, control variables may define particular filtered attribute types and attribute values to be loaded. For example, a filter may specify that all employees with an particular attribute, such as status, with a particular value, such as "active," should be loaded in alternate evaluator 18. Therefore, when certain data changes state, such as when an employee status attribute is set from "active" to "inactive," index module 44 may update the data automatically in alternate evaluator 18 to reflect the changed state and remove the employee data from alternate evaluator 18 based on the filter. Conversely, if the status changed from "inactive" to "active," that value may be read back into alternate evaluator 18. Other embodiments may support various other techniques for defining particular attribute types and/or values to be loaded, indexed, or indexed and loaded along with their corresponding entries.

According to one embodiment of the invention, control variable module 42 may define other parameters at alternate evaluator 18 such as whether alternate evaluator 18 is available, the indexes in effect at alternate evaluator 18, the attributes stored at alternate evaluator 18, and the maximum amount of memory available at alternate evaluator 18. However, the present disclosure contemplates many types of control variables. Various embodiments may include, some, all, or none of the enumerated control variables. In addition, control variables may be configured in alternate evaluator 18 and stored within a portion of memory provided to store control variables by control variable module 42.

According to one embodiment of the invention, retrieve module 44 determines, based on control variables, entries to be retrieved from directory store 12. The entries determined to be retrieved by retrieve module 44 depend on the control variables configured at alternate evaluator 18. For example, if "all entries" is configured, then all entry names in directory store 12 may be retrieved. In particular embodiments of the invention, "load filter" may be configured by the control variables, and retrieve module 44 may search directory store 12 for all attribute values matching a filter based on the control variables.

Retrieve module 44 may determine, based on control variables, attributes to be retrieved from directory store 12, according to one embodiment of the invention. The attributes determined to be retrieved by retrieve module 44 depend on the control variables configured at alternate evaluator 18. For example, if "all attributes" is configured, then all attributes and their corresponding entries in directory store 12 may be retrieved.

According to one embodiment of the invention, load module 46 may pre-load alternate evaluator 18 with data values retrieved by retrieve module 44. For example, on enablement of alternate evaluator 18, data values to be used by alternate evaluator 18 are retrieved from directory store 12. The data values may be pre-loaded by load module 46 before alternate evaluator processes directory operation block 14. The pre-loading of alternate evaluator 18 may allow alternate evaluator 18 to evaluate directory operation block 14 without having to access directory store 12. Additionally, by pre-loading alternate evaluator 18, alternate evaluator 18 may be able to achieve maximum performance on startup, unlike conventional caches that may require time to prepare data.

Load module 46 may maximize the effectiveness of alternate evaluator 18 by using the available alternate evaluator 18 memory as efficiently as possible. For example, where data values repeat in multiple locations, the instances of those data values may be replaced with a pointer. As another example, where data utilizes names that are comprised of the prefix of a root entry and a relative name, the prefix may be removed from the name to reduce the amount of memory required to store the names. As such, the prefix may also operate as a control variable, and where the prefix is common to all data, the prefix may be stored once, and appended to the relative names as necessary. An available memory list may be maintained by load module 46 to keep track of available memory so that memory that was previously used may be quickly identifiable as free memory. However, the present disclosure contemplates many types of memory maximizing operations. Various embodiments may include, some, all, or none of the enumerated memory maximizing operations.

Load module 46 may maintain syntax normalized data values so that multiple units of data do not need to individually store the same sets of values, according to one embodiment of the invention. Syntax normalized values may be created from data values that are indexed. Normalizing values may remove the variation that is allowed by matching rules for the syntax of the values. For example, where an email address attribute for an entry is "joe@yahoo.com" a CaseIgnoreString matching rule may be used by index module 48 to create the syntax normalized value "JOE@YAHOO.COM" where the CaseIgnoreString matching rule is defined as removing leading and trailing spaces, replacing multiple consecutive spaces with a single space and converting the string into upper case. However, the present disclosure contemplates many types of normalizing operations. Various embodiments may include, some, all, or none of the enumerated normalizing operations.

Index module 48 may generate an index, according to control variables, to data values in alternate evaluator 18, according to one embodiment of the invention. For example, "CommonName" may be indexed and loaded, and "Surname" and "TelephoneNumber" may be just loaded and provided in the configuration of control variables at alternate evaluator 18. Index may refer to providing a link to data values associated with "CommonName" in memory, while loading may refer to storing certain information related to "Surname" and "TelephoneNumber", but not indexing such information. In particular embodiments of the invention, the index values may be syntax normalized.

According to one embodiment of the invention, index module 48 may store the syntax normalized index values as a structured index, such as, a B-Tree. A B-tree is a tree data structure that may be used by indexes to facilitate searching. B-trees allow for amortized logarithmic time insertions and deletions of tree elements. A B-tree may have one level, two levels, or more than two levels. In particular embodiments of the invention, having a B-tree with a particular number levels offers several advantages. For example, one advantage of a B-tree with two levels is that searches may be improved when it is known that data values may be accessed two levels down in a tree. For example, the data may be accessed directly using a double de-referenced pointer. Having a particular number of levels in a B-tree may simplify the logic for accessing data values and may optimize data queries. In particular embodiments of the invention, indexes generated by index module 48 may be determined dynamically upon loading of alternate evaluator 18. In other embodiments, the indexes may be determined in accordance with control variables.

According to one embodiment of the invention, index module 48 may receive progressive updates to maintain accuracy of data values in directory store 12 and control variables. An update operation to directory store 12 may include, for example, adding an entry with a name and a set of attributes, removing an entry including any of its associated names, attributes and attribute values, modifying an entry to add and remove an attribute and attribute values, and renaming an entry to change an entry's name by adding, removing or selecting existing attribute values. An update operation to a control variable may include, for example, adding a new entry and set of attributes to be loaded and indexed. In so doing, embodiments of the present disclosure may be able to facilitate the storage of a high occupancy of indexes, minimize the number of comparisons required to execute a query and to provide multiple index types.

According to one embodiment of the invention, index module 48 may generate different types of indexes based on control variables configured at alternate evaluator 18. For example, alternate evaluator 18 may be configured to generate a substring index. A substring index maintains pointers to data values that support substring queries. For example, an index with substrings, such as common name=john*, may maintain pointers to data values matching the wildcard values, such as common name=john doe and common name=john donald. As another example, alternate evaluator 18 may be configured to generate a reverse index. A reverse index may use the reversal of the values rather than the values themselves. Thus, a reverse index may store values, such as phone numbers, backwards. Therefore for an example search for telephone numbers ending in "456," a reverse index may search for reverse telephone numbers beginning with "654". Thus, a reverse index may allow important last characters in a value to be indexed and searched in the event of a search containing a filter looking for a string ending in a particular value. As another example, alternate evaluator 18 may be configured to generate a approximate index. An approximate index provides efficient "sounds-like" searches. For example, the approximate index is useful for searching partial names or misspelled names. However, the present disclosure contemplates many types of index types. Various embodiments may include, some, all, or none of the enumerated index types.

Figure 3:
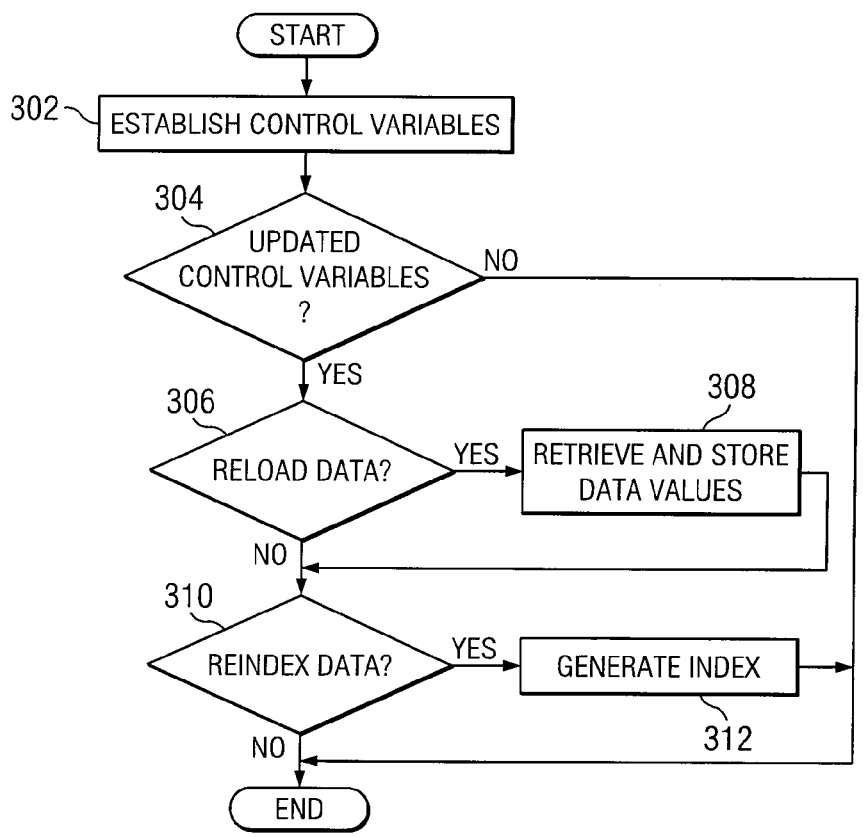
FIG. 3 is a flow chart illustrating example acts associated with a method for creating an index arrangement for a directory.

FIG. 3 is a flow chart illustrating example acts associated with a method for creating an index arrangement for a directory. The example acts may be performed by index creator 40, as discussed above with reference to FIG. 1A and FIG. 1B, or by any other suitable device. At step 302, control variables may be configured. According to one embodiment, control variables may define a list of attribute types to be loaded. This results in the loading of the particular attributes from entries in a directory store. Attributes may refer to a type and one or more values. In addition, control variable module 42 may contain a special parameter that defines that all contents of all attributes should be loaded by setting a control variable to a special keyword, such "load all attributes."Control variables may define other parameters at the alternate evaluator such as whether the alternate evaluator is available, the indexes in effect at the alternate evaluator, the attributes stored at the alternate evaluator, and the maximum amount of memory available at the alternate evaluator.

At step 304, it may be determined whether the control variables configured at 302 have been updated. If the control variables are the same and the alternate evaluator remains unchanged, the process terminates. However, if the control variables contain new configurations, at step 306 it may be determined whether to load data from the directory based on the updated control variables. If the updated control variables require data to be reloaded, at step 308 entries and attributes may be retrieved from the directory. The attributes determined to be retrieved may depend on the control variables configured at the alternate evaluator. By pre-loading the alternate evaluator, the alternate evaluator may be able to achieve maximum performance on startup, unlike conventional caches that may require time to prepare data.

A determination may be made at step 310 as to whether to re-index data at the alternate evaluator. Where the data requires re-indexing, an index may be generated at step 312, according to control variables, to data values in the alternate evaluator 18. For example, "CommonName" may be indexed and loaded, and "Surname" and "TelephoneNumber" may be just loaded and provided in the configuration of control variables at the alternate evaluator. Thus, an index may be generated providing a link to data values associated with "CommonName" in memory.

Thus, the present disclosure addresses a number of techniques to enhance directory performance such as loading data and generating indexes for the values based on control variables at an alternate evaluator. As a result, the speed at which directory operations may be evaluated is significantly increased. Certain embodiments of the present invention can be used in any directory system. The system may operate in accordance with various standards including X.500, LDAP, and DSML.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for processing directory operations, comprising:
configuring a plurality of control variables, the plurality of control variables comprising criteria for data to be stored and indexed;
retrieving a plurality of data values from the directory in accordance with the plurality of control variables;
storing the retrieved data values in electronic memory;
based on the plurality of control variables, generating an index for the stored data values;
receiving a directory operation;
deciding whether to evaluate the directory operation using an evaluator;
in response to deciding not to evaluate the directory operation using the evaluator, evaluating the directory operation by passing the directory operation through one or more processing layers in a data path; and
in response to deciding to evaluate the directory operation using the evaluator, evaluating the directory operation based on stored data values in the index using the evaluator.

2. The method of claim 1, wherein retrieving a plurality of data values from the directory in accordance with a plurality of control variables comprises searching the directory using a search filter based on the plurality of control variables.

3. The method of claim 1, wherein generating an index for the stored data values comprises generating a substring index.

4. The method of claim 1, wherein generating an index for the stored data values comprises generating an approximate index.

5. The method of claim 1, wherein generating an index for the stored data values comprises generating a structured index.

6. The method of claim 1, wherein storing the retrieved data values further comprises syntax normalizing the retrieved data values.

7. The method of claim 1, further comprising updating the generated index to reflect changes to any of the respective data values in the directory.

8. A system for processing directory operations, comprising:
a processor operable to process a directory operation; and
a storage device embodying a program of instructions operable, when executed on the processor, to:
configure a plurality of control variables, the plurality of control variables comprising criteria for data to be stored and indexed;
retrieve a plurality of data values from the directory in accordance with the plurality of control variables;
store the retrieved data values in electronic memory;
based on the plurality of control variables, generate an index for the stored data values;
receive a directory operation;
decide whether to evaluate the directory operation using an evaluator;
in response to deciding not to evaluate the directory operation using the evaluator, evaluate the directory operation by passing the directory operation through one or more processing layers in a data path; and
in response to deciding to evaluate the directory operation using the evaluator, evaluate the directory operation based on stored data values in the index using the evaluator.

9. The system of claim 8, wherein the program of instructions is further operable to search the directory using a search filter based on the plurality of control variables.

10. The system of claim 8, wherein the program of instructions is further operable to generate a substring index.

11. The system of claim 8, wherein the program of instructions is further operable to generate an approximate index.

12. The system of claim 8, wherein the program of instructions is further operable to generate a structured index.

13. The system of claim 8, wherein the program of instructions is further operable to syntax normalize the retrieved data values.

14. The system of claim 8, wherein the program of instructions is further operable to update the generated index to reflect changes to any of the respective data values in the directory.

15. Logic encoded in tangible media, the logic being operable, when executed on a processor, to:
configure a plurality of control variables, the plurality of control variables comprising criteria for data to be stored and indexed;
retrieve a plurality of data values from the directory in accordance with the plurality of control variables;
store the retrieved data values in electronic memory;
based on the plurality of control variables, generate an index for the stored data values;
receive a directory operation;

decide whether to evaluate the directory operation using an evaluator;

in response to deciding not to evaluate the directory operation using the evaluator, evaluate the directory operation by passing the directory operation through one or more processing layers in a data path; and in response to deciding to evaluate the directory operation using the evaluator, evaluate the directory operation based on stored data values in the index using the evaluator.

16. The logic of claim 15, wherein the logic is further operable to search the directory using a search filter based on the plurality of control variables.

17. The logic of claim 15, wherein the logic is further operable to generate a substring index.

18. The logic of claim 15, wherein the logic is further operable to generate an approximate index.

19. The logic of claim 15, wherein the logic is further operable to generate a structured index.

20. The logic of claim 15, wherein the logic is further operable to syntax normalize the retrieved data values.

21. The logic of claim 15, wherein the logic is further operable to update the generated index to reflect changes to any of the respective data values in the directory.

* * * * *